Jan. 7, 1941. R. S. SMITH 2,227,767
FAUCET VALVE
Filed Jan. 19, 1938 3 Sheets-Sheet 2

Inventor
Reuben Stanley Smith.

Attorney.

Jan. 7, 1941.   R. S. SMITH   2,227,767
FAUCET VALVE
Filed Jan. 19, 1938   3 Sheets-Sheet 3
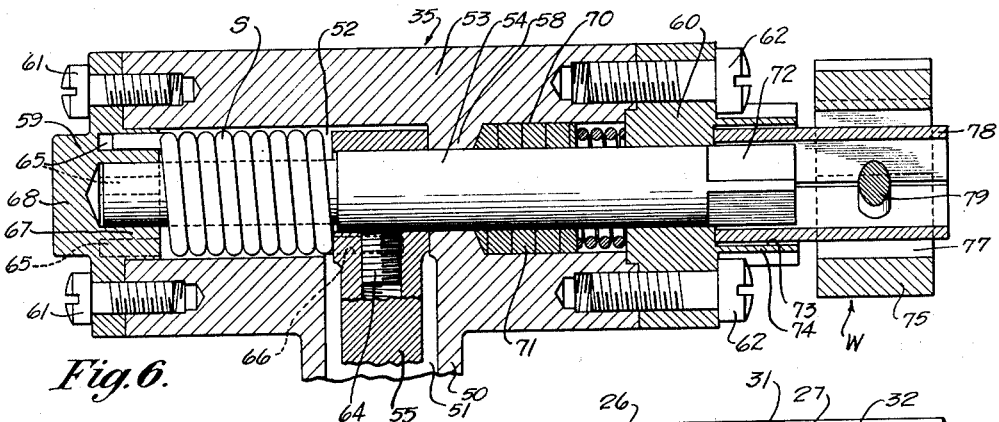
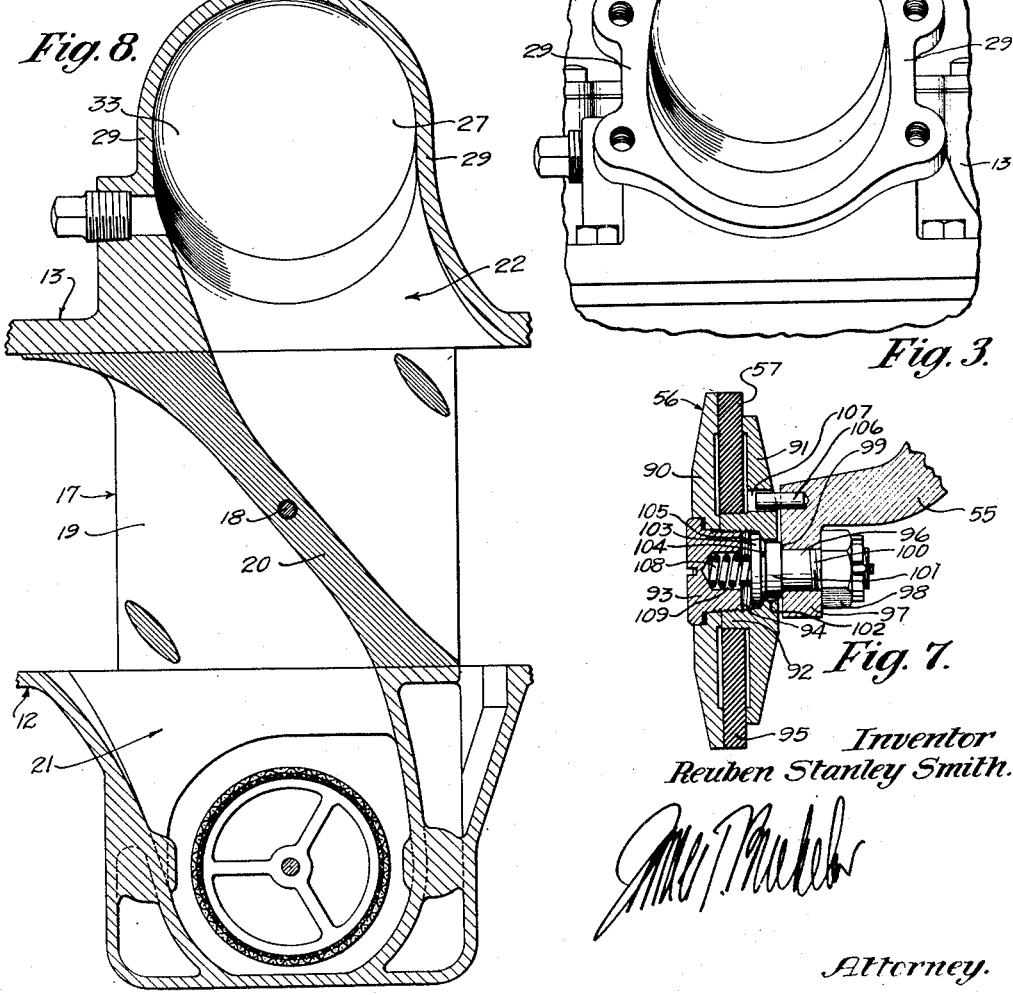
Inventor
Reuben Stanley Smith.
Attorney.

Patented Jan. 7, 1941

2,227,767

UNITED STATES PATENT OFFICE 2,227,767

FAUCET VALVE

Reuben Stanley Smith, Altadena, Calif., assignor to Smith Meter Company, a corporation of California Application January 19, 1938, Serial No. 185,682

2 Claims. (Cl. 251—10)

This invention relates generally to faucet valves and is more particularly concerned with a novel valve of quick-opening type.

I will describe my invention as applied to a certain type of meter and as put to a particular use but it will be understood this is done merely by way of illustration and is not at all to be considered as limitative on the broader aspects of the invention.

The meter I have chosen to illustrate is of that type fully illustrated and described in my co-pending application on Fluid flow mechanism filed November 26, 1937, Serial Number 176,573, and, for the purpose of this discussion, it will be assumed that the meter is to be installed on a tank truck for measuring amounts of gasoline or the like delivered to service station storage tanks. It then becomes necessary for the operator to be in complete control of the fluid-flow through the meter, it being highly desirable that the faucet valve by which he controls this flow be such that it may be operated easily and quickly. It should be such that the discharge line may be opened up fully so as to accomplish the delivery in as short a time as possible and yet with the valve in condition to completely check the discharge as soon as the meter-reading indicates delivery of the predetermined amount of fluid. It must be such that it closes tightly to prevent leakage, and yet so constructed that it requires minimum time and effort to open it.

Additionally, the valve should be so arranged that, when open, the parts and structure thereof offer minimum resistance to the flow of fluid therethrough, for obvious reasons. It is also desirable that the valve be mechanically uncomplicated, unlikely to get out of order and generally of a nature to withstand the severe service conditions to which devices of this type are exposed.

Also it is of considerable important to reduce to a minimum the overall dimensions of the combined meter and valve housing, and to provide a "close couple" between meter and delivery pipe through the faucet, for it will be understood that space is at a premium on tank trucks or the like, and but very little of that space can be allotted to a meter installation. In attempting thus to reduce the overall extent, it still remains desirable in no way to reduce the sizes of or have abrupt direction changes in meter or valve passages, or to cramp the valve mechanism in a manner to reduce its efficiency. Likewise it is desirable to preserve a smooth uninterrupted passage from meter through valve, when the latter is open.

It is among the objects of my invention to provide devices having all the above mentioned desirable features. How this is accomplished, as well as other objects and features of the invention, will be made apparent from consideration of the following detailed description, reference being had to the accompanying drawings, in which:

Fig. 3 is a fragmentary view of the meter casing with the valve housing detached;

Fig. 6 is an enlarged section on line 6—6 of Fig. 1;

Fig. 7 is an enlarged medial section through the stopper of the valve; and

Fig. 8 is a section on line 8—8 of Fig. 1.

Figure 1:
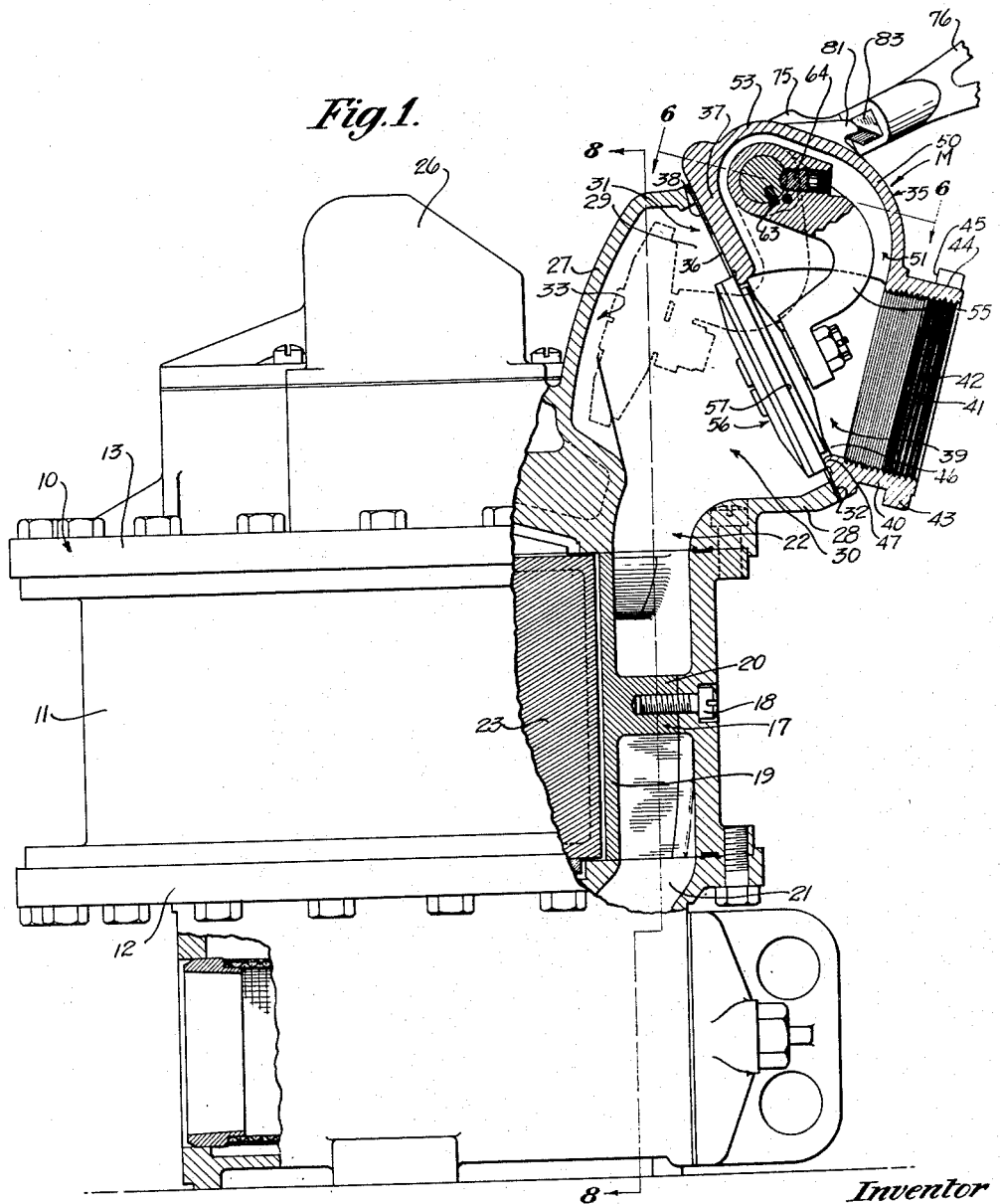
Fig. 1 is a side elevation, partly in medial section, of an embodiment of my invention.

As stated in the fore-part of the specification, I have illustrated the invention as applied to a particular type of meter, but the following description thereof is for purposes of explanation only and is not to be considered as limitative on my broader claims.

The illustrated meter is of the rotary type wherein blades are shuttled successively across and sweep through the flow channel during rotation of the blade-supporting rotor. The meter casing generally indicated at 10 includes a vertically arranged barrel 11 closed at its bottom and top by detachable end-walls made up of base and cover 12 and 13, respectively.

Rotor 14 is mounted concentrically within casing 10 by shaft 15, the annular space 16 thus defined by rotor and casing comprising the flow channel of the meter. A dividing block or barrier 17 is interposed in the flow channel, being secured to barrel 11 at 18, and comprising an arcuate plate-portion 19 and a diagonal partition wall 20 (Fig. 8).

Opening to flow channel 16 and located at the bottom and one side of wall 20 is inlet passage 21, while the flow channel opens at the top and opposite side of wall 20 to the substantially vertically extending outlet passage 22 provided in the meter casing 10—in this particular case the passage 22 being in the cover member 13 of the casing, though this is not limitative on the invention.

Blades 23 are supported by rotor 14 and are adapted to be held projected across the flow channel while opposite block 17, and then to be retracted to clear the block, by coaction between the blade-carried rollers 24 and the stationary cam 25, the fluid, in its passage through the flow-channel acting against the projected blades to cause rotor-rotation. It is unnecessary for the purpose of this application to describe any of these elements or their operation in detail as they play no part in the present invention and are shown and mentioned only in order that the significance of certain of the passages and the defining housing structure may be apparent.

For the same reason it is unnecessary here to show or describe the registration mechanism for indicating the amount of fluid-flow through the meter. It will suffice to say that suitable mechanism (not shown) is adapted to connect rotor 14 and the registering mechanism (not shown) contained in the counter housing 26 on cover 13, whereby that mechanism indicates the amount of fluid flow. The counter is actually a rotor-revolution counter, it having been predetermined that the meter passes a certain volume of fluid per revolution and the counter being calibrated in suitably correlated volumetric units.

The faucet valve for controlling the measured delivery of fluid from the meter is generally indicated at M. As has been said previously, it is highly desirable that this valve occupy minimum horizontally extending space beyond the meter casing. To this end, I have devised an arrangement wherein a part of the enclosing structure for the valve mechanism, overlies, in effect, a part of the meter casing, proper, thus correspondingly reducing (for a valve of given size and capacity) the horizontally overhanging extent of the complete enclosing structure.

As a further feature, in the preferred and illustrated embodiment of my invention, a part of this enclosing structure is formed as an integral part of the meter casing (here shown as the cover 13, though this is not limitative) there thus being effected both material and space economy, as well as a simplification of the separately fabricated and subsequently applied remaining portion of the valve.

Cover 13 is extended upwardly by wall 27 and horizontally outwardly by wall 28, which walls, taken with side walls 29 (Fig. 3) define outlet chamber 30. Chamber 30 overlies and is in open communication with outlet passage 22 and, in turn, opens outwardly at 31, opening 31 being vertically elongated and bounded by the smooth, continuous edge-face 32 of said walls, this face inclining upwardly and inwardly towards the oppositely inclining wall 27.

It will be seen that wall 27 and face 32 are arranged at opposite sides of outlet passage 22, wall 27 being offset to the left therefrom (Fig. 1) and thus defining a recess 33 likewise offset to the left from said passage. On the other hand, the outer end of wall 28 and hence the lower end of face 32 is offset to the right from passage 22.

Figure 2:
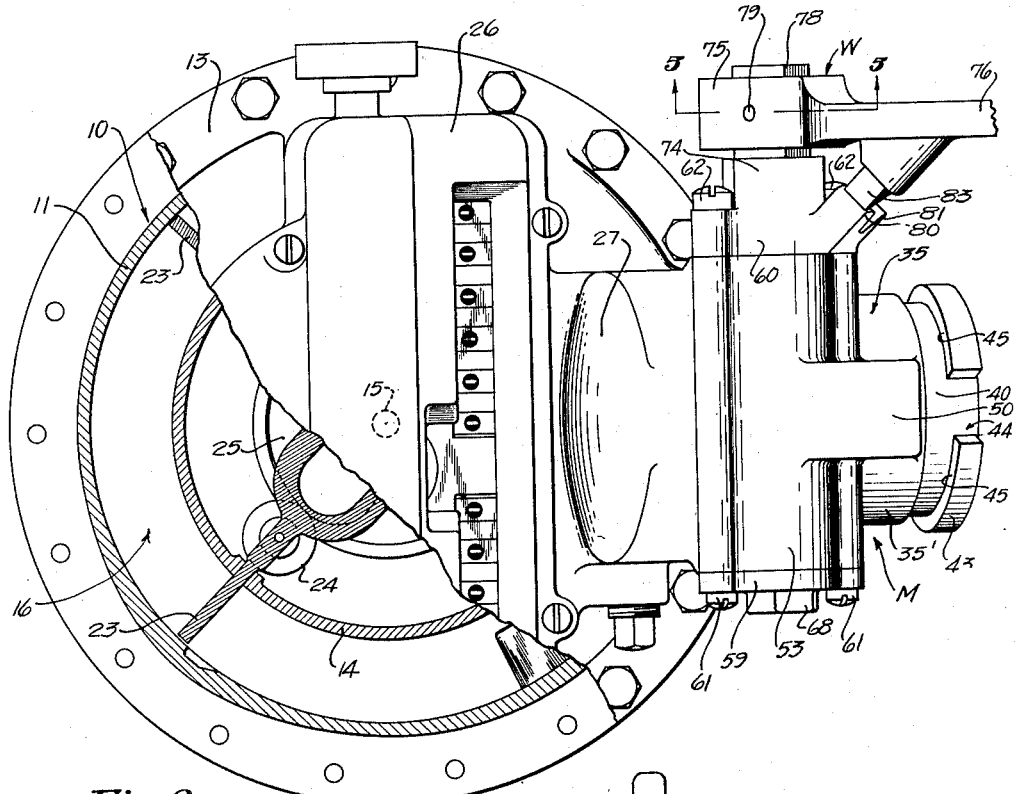
Fig. 2 is a top plan view, partly in broken-away section, of Fig. 1.
Figure 4:
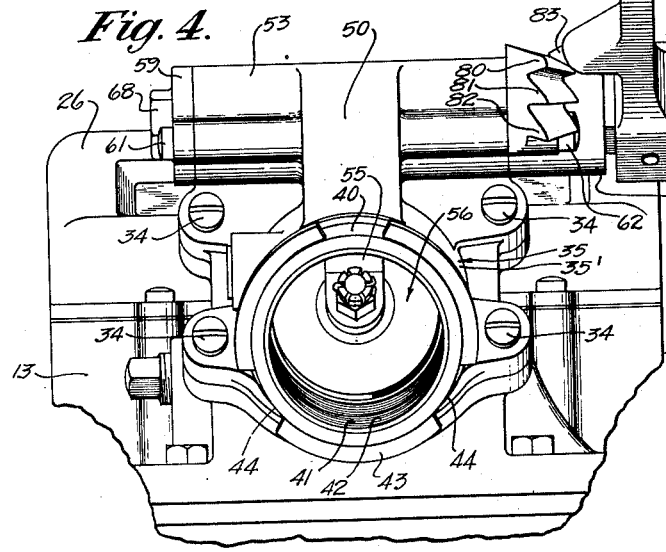
Fig. 4 is a view similar to Fig. 3 but showing the faucet valve applied thereto.
Figure 5:
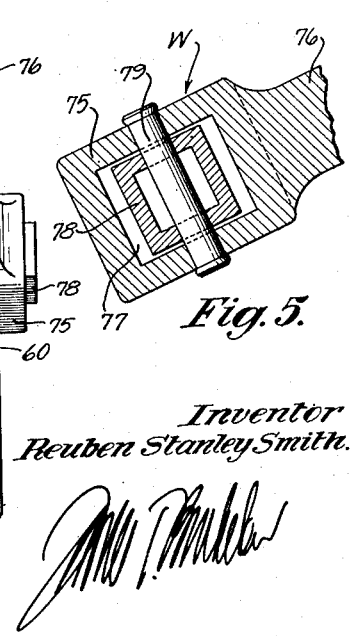
Fig. 5 is an enlarged section on line 5—5 of Fig. 2.

Attached to face 32 by bolts 34 is valve housing 35, the tubular portion 35' thereof having an end-face 36 which continues upwardly as the outer face of inclined wall 37, gasket 38 preferably being interposed between the two faces. Housing 35 defines a bore or chamber 39 which is circular in cross-section and from which extends a neck 40, the latter defining an outlet passage 41 and serving to take a hose or pipe coupling. For this purpose neck 40 may either have internal threads 42 or an exterior flange 43, or it may have both. Flange 43 is interrupted by ways 44 (Fig. 2) and has inclined wedge faces 45 to take a well known type of hose coupling (not shown).

Formed in face 36 about the end 46 of bore 39 (which end may be considered a port adapted to put chambers 30 and 39 into communication) is an annular valve seat 47, it being apparent that this seat may be expeditiously and accurately formed since face 36 is full exposed before the housing is applied to the meter casing. Port 46 and seat 47 are offset to the right (Fig. 1) from passage 22.

Wall 37 and housing portion 50 define a recess 51 opening downwardly into chamber 39 and upwardly into the transverse bore 52 (Fig. 6) provided in horizontally elongated boss 53. A rock-shaft 54 is mounted for oscillation in bore 52, an arm 55 being secured to this shaft and carrying at its lower end a valve stopper generally indicated at 56 having an annular seating face 57.

Shaft 54 has bearing in boss 53 at 58 and in end caps 59 and 60 which are detachably secured by screws 61 and 62, respectively, to the boss. The shaft and arm 55 are held against relative rotation by key 63 (Fig. 1) and against relative longitudinal movement by set screw 64, the latter being accessible through neck 41 when the stopper is swung to the open, dotted-line position of Fig. 1.

A torsion spring S encircles the shaft and has its opposite ends projected into sockets 65 and 66 and in cap 59 and arm 55, respectively, sockets 65 being sunk in the end of cap-hub 67 which has close but rotational fit in bore 52. Spring S is adapted normally to rotate shaft 54 in a direction to engage stopper 57 with seat 47 and yieldingly to maintain that engagement. It will also be noted that the stopper is so disposed that the pressure of the fluid within the meter is normally directed against it in a manner tending to hold the valve closed once it has been moved to the position of Fig. 1.

Should it be desired to adjust spring S to vary the torsional and hence the valve-closing effect thereof, screws 61 may be backed out and cap 59 rotated by applying a wrench to the polygonal head 68 thereof, thus twisting the spring tighter or allowing it to loosen, whereupon screws 61 are replaced. Of course, cap 59 may only be rotated by increments of 180° angular movement due to the necessity of finally positioning it so screws 61 will match the screw-taking bores of the boss. Since it may be desirable to secure a finer adjustment, there is provided a plurality of sockets 65 angularly spaced about hub 67, the spacing being a fraction of 180°. Thus, if a finer adjustment is required, cap 59 may be cleared from the end of the spring, rotated until a chosen socket registers with the spring end, then pushed in to enter the spring end in that socket, and finally rotated until the screw holes in cap 59 and boss 53 are in register, whereupon the cap is re-anchored by screws 61.

Shaft 54 extends through stuffing box 70 made up of spring-pressed packing 71, and terminates in squared end 72 which projects into the enlarged bore 73 of cap extension 74.

Any suitable tool may be applied to end 72 for rocking shaft 54 and thus swinging or controlling the swing of stopper 56, but I have here shown a preferred form of socket wrench W. It embodies a head 75 integral with handle 76 and having a squared opening 77 extending transversely therethrough. A square socket 78 extends with ample side clearance through opening 77, a pin 79 securing the socket and head together but allowing them to have limited relative pivotal movement. Socket 78 is of an inside dimension as to take shaft square 72 and of an outside dimension to permit its rotation within bore 73.

It will be seen that by applying wrench W in the manner shown in Fig. 6 handle 76 may be depressed to rotate shaft 54 against the action of spring S (in a clockwise direction, as viewed in Fig. 1) and thus to swing stopper 56 from seat 47 to open the faucet valve. As means for releasably holding the valve open in a chosen one of a plurality of positions, I form on cap 60 a plurality of ratchet teeth 80, 81 and 82, and provide wrench handle 76 with a complementary tooth 83. As the handle is depressed to open the valve, it may be swung inwardly on pivot pin 79 to engage tooth 83 with the underside of a chosen tooth on cap 60, whereupon that cap-tooth will hold the wrench and therefore the shaft from being rotated by spring S in a manner to reclose the valve.

In order to free the valve for closing movement under the impulse of spring S, it is merely necessary to swing handle 76 outwardly on pivot pin 79 and thus clear tooth 83 from the cap-teeth. This freeing may be accomplished from a remote position by means of a rod or stick thrust against the wrench handle, in the event accident or fire prevents the operator from closely approaching the wrench.

When tooth 83 engages the holding face of tooth 80, the valve is just slightly open, when tooth 81 is engaged, the valve is about half open, and when tooth 82 is engaged the valve is fully open and stopper 56 will occupy the dotted line position of Fig. 1. It will be noted that when stopper 56 is swung from closed to full-open position, or vice versa, it moves substantially horizontally from an offset position at one side of channel 22 to an offset position at the opposite side thereof, and thus, in effect, traverses one of the meter-casing passages.

Thus, when the valve is fully open, stopper 56 lies within the offset recess 33 and at one side of outlet passage 22 so that it in no way interferes with the fluid flow from that passage to chamber 39, an obvious advantage. It will be noted that arm 55 is bent into substantially V or U shape, thus avoiding interference with wall 37 as the stopper is swung into or out of seated position.

It will also be noted that the relative positions of the various internal elements of the valve and of the defining walls of the chambers and passages, are such that the fluid in its flow from passage 22 to outlet 41 has a smooth, substantially uninterrupted path with no abrupt changes in direction, the advantages of which are self-evident.

I have shown a preferred, though not limitative, means for connecting valve stopper or disk 56 to arm 55, this connection being generally of a nature allowing limited relative universal movement between said stopper and arm, it following that the stopper is free to adjust itself to seat 47 in a manner to insure complete valve closure, even though the arm itself is rigid and must follow a fixed path which, of itself, might not always insure a complete seating of the stopper but, to the contrary, if not initially absolutely accurate or if initially accurate and later developing inaccuracies, might positively cause an incomplete or uneven seating.

Stopper 56 embodies a relatively large disk 90 and a relatively small disk 91, disk 91 having a hollow hub 92 extending toward the inner face of disk 90. Screw 93 extends from disk 90 into threaded bore 94 of hub 92, serving to draw said disks together in a manner to clamp seating ring 95 between them. Ring 95 is made of any suitable material or composition such as synthetic rubber, and is of the full diameter of disk 90, thus being backed up in a manner to prevent it from flexing when closing pressure is applied to the stopper. On the other hand, the relatively small diameter of disk 91 leaves exposed the annular portion 57 of ring 95, which portion is thus available for engaging seat 47, as has been explained.

A pin 96 is secured to annular extension 97 of arm 55 by nut 98, the shoulder 99 formed at the junction of threaded-shank portion 100 and collar portion 101 engaging the outer face of extension 97. Collar 101 extends, with annular clearance, through reduced bore-portion 102 in disk 91, the head 103 of the pin being taken, with clearance, in bore 94. Preferably, the underside 104 of head 103 is conical and fits a complementary seat 105 at the junction of bores 94 and 102. Stationary pin 106 extends from arm 55 into a loosely fitting socket 107 of disk 91, thus serving to prevent other than limited relative rotation between the arm and the stopper assembly.

Shoulders 99 and 104 are so spaced that stopper 56 may, to a limited extent, shift bodily toward and away from arm 55, this capacity for movement together with the described fit of pin 96 in the disk-assembly, allowing said disk assembly or stopper to have limited universal movement with respect to the arm. By virtue of this universal joint arrangement, the stopper is capable of self-adjustment to seat 47, as will be readily understood, with all the attendant, self-evident advantages.

In order yieldably to hold the stopper against such movement while it is clear of the seat, which might otherwise develop undue wear of parts and tend always to make the stopper initially seat unevenly, I provide a compression spring 108 which extends from bore 109 in screw 93 into engagement with head 103. It will be seen that the spring tends to hold the stopper 56 normally in the position of Fig. 7, that is, so the stopper is substantially coaxial, or, at least, in coaxial parallelism with pin 96.

While I have shown and described a preferred embodiment of the invention, it will be understood various changes in design, structure and arrangement may be made without departing from the spirit and scope of the invention.

I claim:

1. In a valve of the character described, a stopper embodying a pair of spaced disks of different diameters and having central bores, a seating ring between the disks and of greater diameter than the smaller disk so an annulus of its side face is exposed at one side of the stopper, a screw entered in the bores of the two disks from the outer end of the bore of one of the disks whereby the ring is clamped between them, a headed pin having its head disposed in the bore of the other disk and the pin shank extending from said bore to the exterior of the stopper, and a compression spring interposed between the opposed ends of said screw and pin-head.

2. In a valve of the character described, a rock shaft, an arm extending from the rock shaft, a cylindrical valve-stopper having a central bore therethrough, a pin supported at one end by said arm and with its other end projecting into said bore from one end thereof but capable of limited relative universal and axial movement with respect to the stopper, a detachable plug in the other end of said bore, and a spring in said bore and acting between the plug and pin to hold the pin and stopper yieldingly against such universal movement and tending to move the stopper axially of the pin in a direction away from the arm-supported end thereof.

REUBEN STANLEY SMITH.